United States Patent
Gellert et al.

[11] Patent Number: 6,030,202
[45] Date of Patent: Feb. 29, 2000

[54] INJECTION MOLDING THREE PORTION GATE AND CAVITY INSERT

[75] Inventors: Jobst Ulrich Gellert, Georgetown; Itsuto Nakanishi, Toronto, both of Canada

[73] Assignee: Mold-Masters Limited, Georgetown, Canada

[21] Appl. No.: 09/036,910

[22] Filed: Mar. 9, 1998

[30] Foreign Application Priority Data

Feb. 2, 1998 [CA] Canada ................................ 2228931

[51] Int. Cl.⁷ .......................... B29C 45/20; B29C 45/73
[52] U.S. Cl. ........................................ 425/549; 425/552
[58] Field of Search ................................ 425/542, 547, 425/548, 549, 562, 567, 568

[56] References Cited

U.S. PATENT DOCUMENTS 4,622,001  11/1986  Bright et al. .
5,443,381   8/1995  Gellert .

*Primary Examiner*—Tim Heitbrink
*Attorney, Agent, or Firm*—Dalesman & Company

[57] ABSTRACT

An injection molding one-piece gate and cavity insert with the gate extending therethrough which receives a heated nozzle and forms part of the cavity. The gate and cavity insert has a cooling fluid passage extending through it. The gate and cavity insert has an inner portion, an outer portion and a gate portion. The inner and outer portions which are in contact with the cooling fluid are made of a corrosion resistant material such as stainless steel. The gate portion which is not in contact with the cooling fluid is made of a more wear and heat-shock resistant material such as H13 tool steel or a tungsten carbide.

4 Claims, 3 Drawing Sheets

INJECTION MOLDING THREE PORTION GATE AND CAVITY INSERT

BACKGROUND OF THE INVENTION

This application relates generally to injection molding apparatus and more particularly to a one-piece gate and cavity insert formed of three components which are integrally joined together.

Injection molding apparatus having gate and cavity inserts with cooling fluid flow passages which form a portion of the cavity and through which the gate extends to convey melt from a heated nozzle through the cavity are well known. For example, U.S. Pat. No. 4,622,001 to Bright et al. which issued Nov. 11, 1986 shows a gate and cavity insert made of two separate pieces which are bolted together. More recently, U.S. Pat. No. 5,443,381 to Gellert which issued Aug. 22, 1995 shows a one-piece gate and cavity insert formed of inner and outer components or portions which are integrally joined together with a cooling fluid flow passage extending therethrough. The outer component is made of a suitable steel such as H13 or stainless steel, while the inner component is made of a beryllium-nickel alloy which is more heat conductive and corrosion resistant.

While these previous configurations are satisfactory for many applications, it has been found that there is excessive wear in the gate area when molding certain materials under certain conditions.

SUMMARY OF THE INVENTION

Accordingly, it is a object of the present invention to at least partially overcome the disadvantages of the prior art by providing one-piece cooled gate and cavity inserts having inner and outer portions which are in contact with the cooling fluid formed of a corrosion resistant material and a gate portion through which the gate extends formed of a more wear resistant material.

To this end, in one of its aspects, the invention provides an injection molding one-piece gate and cavity insert to be mounted in a mold between a heated nozzle and a cavity. The gate and cavity insert has a rear inner surface which is recessed to receive the nozzle and a front surface which provides a portion of a rear surface of the cavity. A gate extends centrally through the gate and cavity insert from the rear surface to the front surface to convey melt from the nozzle to the cavity. A cooling fluid flow passage extends through the gate and cavity insert from a cooling fluid inlet to a cooling fluid outlet. The gate and cavity insert has an inner portion, an outer portion and a gate portion integrally joined together. The inner portion fits in the outer portion to form the cooling fluid flow passage between them. The gate portion fits in at least one of the inner and outer portions and has the gate extending through it. The inner and outer portions are formed of a corrosion resistant material and the gate portion is formed of a material that is more wear resistant and conductive than the material forming the inner and outer portions.

Further objects and advantages of the invention will appear from the following description taken together with the accompanying drawings.

DETAILED DESCRIPTION OF THE INVENTION

Figure 1:
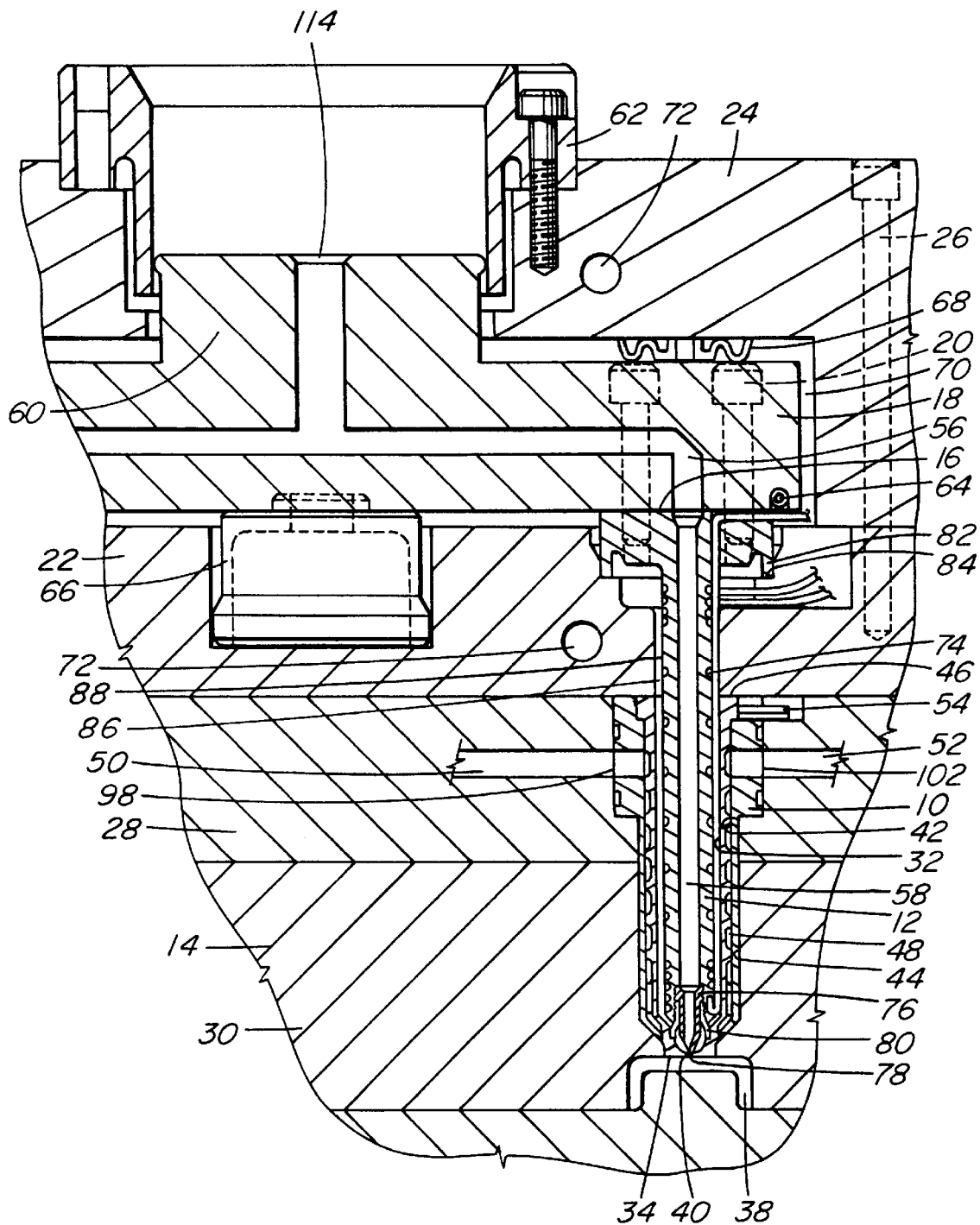
FIG. 1 is a sectional view of a portion of a multi-cavity injection molding system showing a gate and cavity insert according to one embodiment of the invention.

Reference is first made to FIG. 1 which is a sectional view of a portion of a multi-cavity injection molding system or apparatus showing a one-piece gate and cavity insert 10 according to one embodiment of the invention. A number of elongated heated nozzles 12 are mounted in a mold 14 with their rear ends 16 secured to a steel melt distribution manifold 18 by bolts 20. While the mold 14 can have a greater number of plates depending upon the application, in this case only a manifold plate 22 and a clamp plate 24 secured together by bolts 26, as well as a cavity backup plate 28 and a cavity plate 30 are shown for ease of illustration.

Each gate and cavity insert 10 has a recessed rear inner surface 32 which forms the nozzle well, a front surface 34 which in this embodiment forms part of the rear surface 36 of a cavity 38, and a gate 40 extending centrally therethrough from the nozzle well 32 to the front surface 34 to convey melt from the nozzle 12 to the cavity 38. The gate and cavity insert 10 fits in an opening 42 extending through the cavity backup plate 28 and an aligned opening 44 extending through the cavity plate 30 with its rear end 46 abutting against the manifold plate 22. A double spiral cooling fluid passage 48 extending through the gate and cavity insert 10 is connected by cooling fluid inlet and outlet conduits 50, 52 to a source (not shown) of a suitable cooling fluid, such as water. A locating pin 54 extending from the gate and cavity insert 10 into the cavity backup plate 28 ensures the cooling fluid passage 48 is properly aligned with the inlet and outlet conduits 50, 52.

A melt passage 56 branches in the melt distribution manifold 18 and extends through a central melt bore 58 in each heated nozzle 12 to the gate 40 leading to the cavity 38. The melt distribution manifold 18 has a cylindrical inlet portion 60 surrounded by a locating ring 62 and is heated by an integral electrical heating element 64. The melt distribution manifold 18 is mounted between the manifold plate 22 and the clamp plate 24 by a central manifold locator 66 and a number of pressure disks 68 which provide an insulative air space 70 between the heated manifold 18 and the surrounding mold 14 which is cooled by pumping a cooling fluid such as water through cooling conduits 72.

Each nozzle 12 has an integral electrical heating element 74 extending around the central melt bore 58. In this embodiment, each heated nozzle 12 also has a tip insert 76 with a pointed forward tip 78 which is held in place by a threaded retaining collar 80. The retaining collar 80 abuts and locates with the gate and cavity insert 10 to accurately align the pointed tip 78 of the tip insert 76 with the gate 40 leading to the cavity 38. The heated nozzle 12 also has a flange portion 82 adjacent its rear end 16 which fits in a circular seat 84 in the manifold plate 22. This locates the heated nozzle 12 with an insulative air space 86 extending between the outer surface 88 of the heated nozzle 12 and the rear inner surface 32 of the gate and cavity insert 10.

Figure 2:
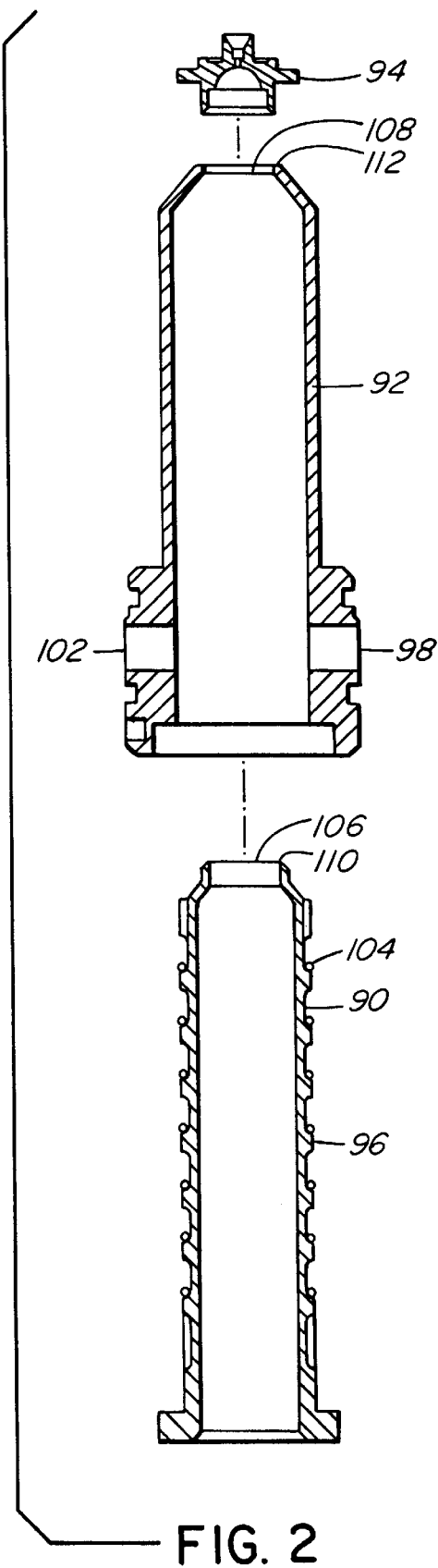
FIG. 2 is an exploded isometric view showing the inner, outer and gate portions of the gate and cavity insert seen in FIG. 1 in position for assembly.
Figure 3:
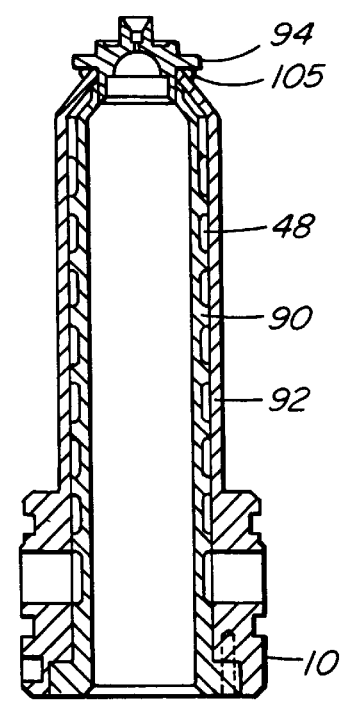
FIG. 3 is a sectional view showing the inner, outer and gate portions assembled.

Reference is now made to FIGS. 2–5 to describe in detail the gate and cavity insert 10 according to this embodiment and a method of making it. As seen in FIG. 2, the gate and cavity insert 10 is made of three components or portions, a hollow inner portion 90, a hollow outer portion 92 and a gate portion 94. The inner portion 90 has a ridged outer surface 96 which fits into the outer portion 92 to form the cooling fluid passage 48 between them. As shown by the arrows in FIG. 5, the cooling fluid passage 48 extends frontwardly through a double spiral from an inlet 98 in alignment with the cooling fluid inlet conduit 50, around the front end 110 of the inner portion 90, and then returns through the double spiral to an outlet 102 in alignment with the cooling fluid outlet conduit 52. A bead 104 of nickel alloy brazing paste is applied along the ridged outer surface 96 and the inner portion 90 is inserted into the outer portion 92. A bead 105 of nickel alloy brazing paste 104 is also applied to the gate portion 94 and it is inserted into adjacent openings 106, 108 at the front ends 110, 112 of the inner and outer portions 90, 92. The inner and outer portions 90, 92 which are in contact with cooling water flowing through the double spiral passage 48 are made of one or more corrosion resistant materials such as stainless steel and the gate portion 94 through which the gate 40 extends is made of a more wear and heat-shock resistant and more conductive material such as H13 tool steel or tungsten carbide.

Figure 4:
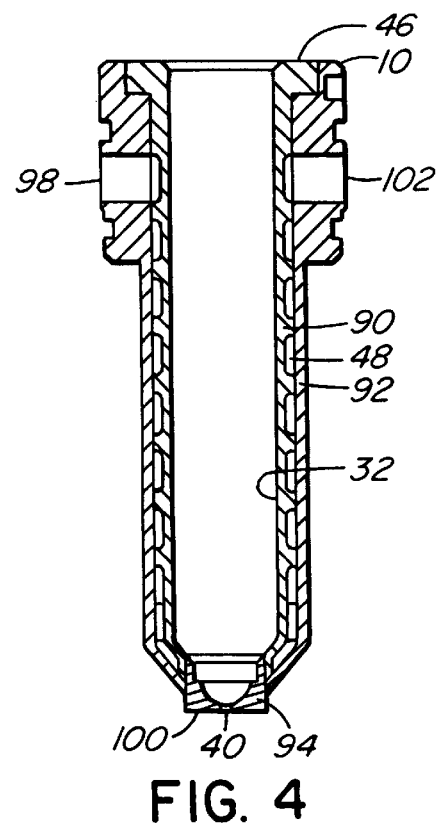
FIG. 4 is a sectional view of the completed gate and cavity insert.

The assembled inner and outer portions 90, 92 and gate portion 94 are gradually heated in a vacuum furnace to a temperature of approximately 1925° F. which is above the melting point of the nickel alloy. As the furnace is heated, it is evacuated to a relatively high vacuum to remove substantially all of the oxygen and then partially backfilled with an inert gas such as argon or nitrogen. When the melt point of the nickel alloy is reached, it melts and flows by capillary action between the gate portion 94 and the inner and outer portions 90, 92 to integrally braze the three portions together to form the one-piece gate and cavity insert 10 shown in FIG. 3. Brazing them together this way in the vacuum furnace provides a metallurgical bonding between them to maximize the strength of the gate and cavity insert 10 and prevent leakage of the cooling water. After removal of the gate and cavity insert 10 from the vacuum furnace, it is machined to the functional size and configuration as shown in FIG. 4.

In use, the injection molding apparatus or system is first assembled as shown in FIG. 1. While only a single cavity 38 has been shown for ease of illustration, it will be appreciated that the melt distribution manifold 18 normally has many more melt passage branches extending to numerous cavities 38 depending upon the application. Electrical power is applied to the heating elements 64, 74 in the manifold 18 and nozzles 12 to heat them to a predetermined operating temperature. Water or another suitable cooling fluid at predetermined temperatures is supplied to the double spiral cooling fluid passage 48 and the cooling conduit 72 to cool the gate and cavity inserts 10 and the mold 12. As can be seen, the cooling water flowing through the spiral passage 48 is only in contact with the inner and outer portions 90, 92 of the gate and cavity insert 10 made of the corrosion resistant material and not with the gate portion 94 made of the more wear and heat-shock resistant material. Hot pressured melt is then injected from a molding machine (not shown) into the melt passage 56 through a central inlet 114 according to a predetermined cycle in a convention manner. The melt flows through the melt bores 58 in the heated nozzles 12 into the cavities 38. When the cavities 38 are full, injection pressure is held momentarily to pack and then released. After a short cooling period, the mold 14 is opened for ejection. After ejection, the mold 14 is closed and injection pressure is reapplied to refill the cavities 38. This cycle is repeated continuously with a frequency depending upon size of the cavities 38 and the type of material being molded.

Figure 5:
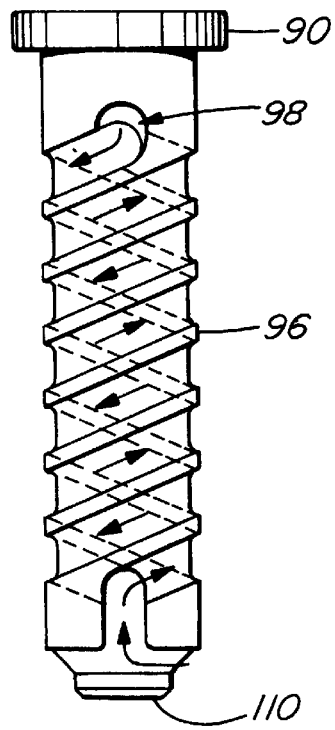
FIG. 5 is an isometric view of the inner portion of the gate and cavity insert illustrating the pattern of cooling flow therearound.
Figure 6:
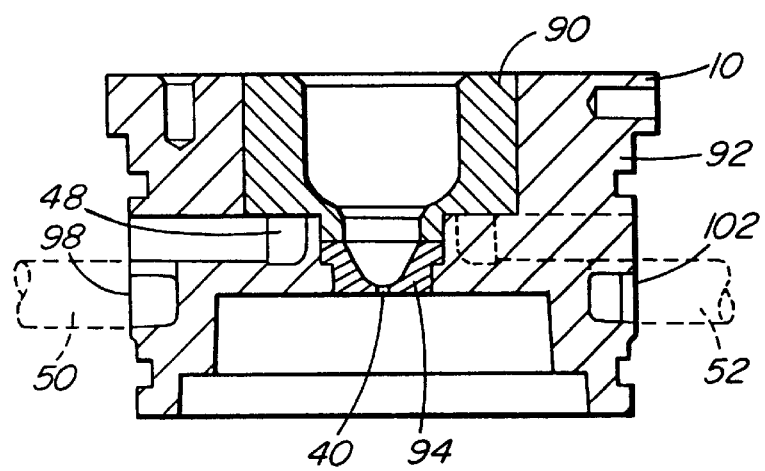
FIG. 6 is a sectional view of a gate and cavity insert according to another embodiment of the invention.

Reference is now made to FIG. 5 to describe another embodiment of the invention. In this embodiment, the gate and cavity insert 10 is not elongated and the cooling fluid passage 48 extends both forwardly and rearwardly and inwardly and outwardly as described in the applicant's Canadian Patent Application Serial Number 2,228,458 entitled "Injection Molding Cooled Gate Insert" filed concurrently herewith rather than in a spiral as in the embodiment described above. However, it does have inner and outer portions 90, 92 formed of a corrosion resistant material and a gate portion 94 formed of a more wear and heat-shock resistant material and is made by the same method and used the same as described above.

While the description of the injection molding three portion gate and cavity insert has been given with respect to preferred embodiments of the invention, it will be evident that various other modifications are possible without departing from the scope of the invention as understood by those skilled in the art and as defined in the following claims.

The embodiments of the invention in which an exclusive property or privilege is claimed is defined as follows:

1. In an injection molding one-piece gate and cavity insert to be mounted in a mold between a heated nozzle and a cavity, the gate and cavity insert having a rear inner surface which is recessed to receive the nozzle, a front surface which provides at least a portion of a rear surface of the cavity, a gate extending centrally therethrough from the rear inner surface to the front surface to convey melt from the nozzle to the cavity, and at least one cooling fluid flow passage extending therethrough from a cooling fluid inlet to a cooling fluid outlet, the improvement wherein;

the gate and cavity insert has an inner portion, an outer portion and a gate portion integrally joined together, the inner portion fitting in the outer portion to form the at least one cooling fluid flow passage therebetween, the gate portion fitting in at least one of the inner and outer portions and having the gate extending therethrough, the inner and outer portions are formed of a corrosion resistant material and the gate portion is formed of a material that is more wear resistant and conductive than the material forming the inner and outer portions.

2. A one-piece gate and cavity insert as claimed in claim 1 wherein the inner and outer portions of the gate insert are made of stainless steel.

3. A one-piece gate and cavity insert as claimed in claim 2 wherein the gate portion of the gate and cavity insert is made of H13 tool steel.

4. A one-piece gate and cavity insert as claimed in claim 2 wherein the gate portion of the gate and cavity insert is made of carbide steel.

* * * * *